Oct. 22, 1935.           C. BRAUN             2,017,941
             DEVICE FOR CLEANING RECEPTACLES
              Filed Jan. 4, 1927    14 Sheets-Sheet 6
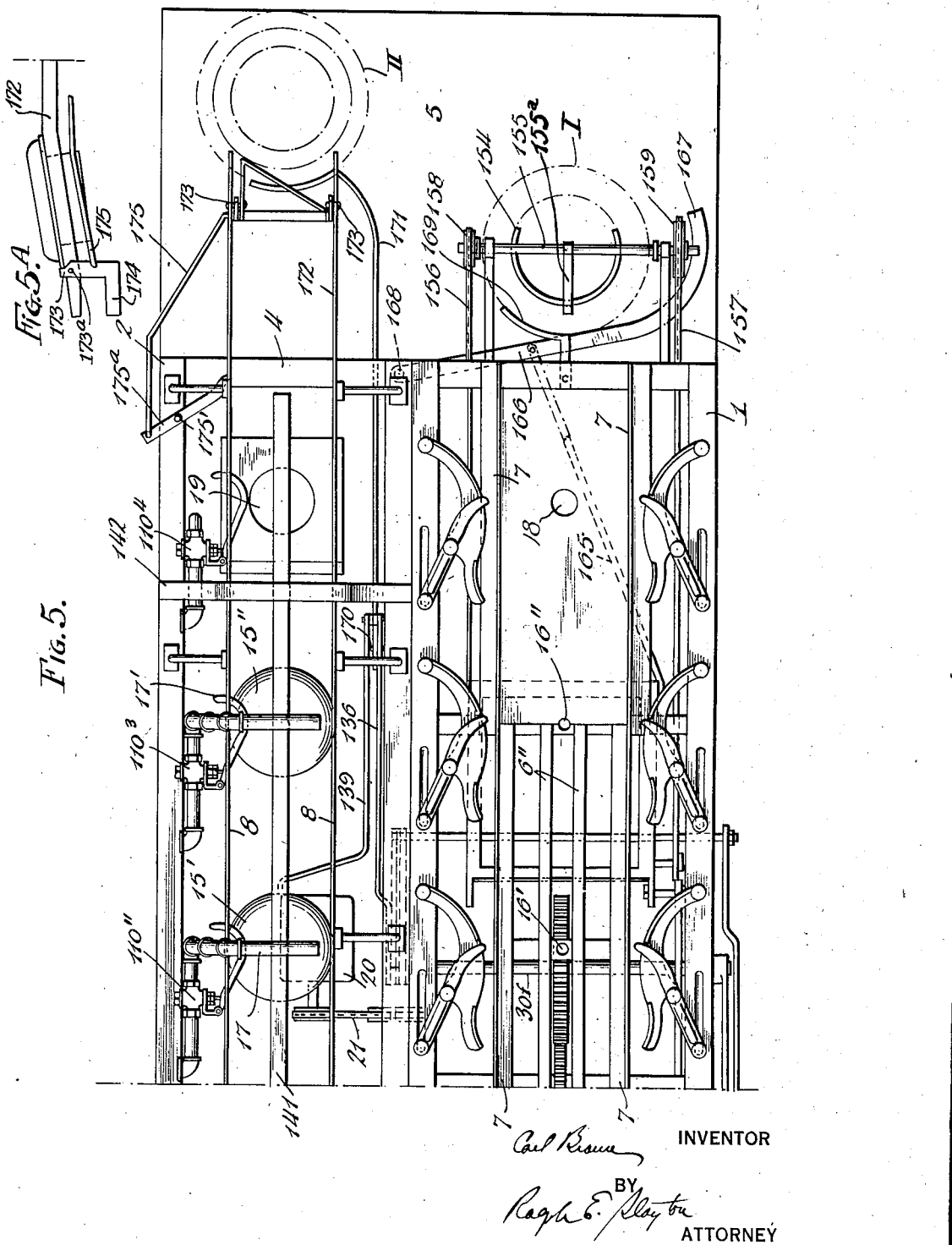
INVENTOR
Carl Braun
BY
Ralph E. Clayton
ATTORNEY Oct. 22, 1935.                    C. BRAUN                    2,017,941
                        DEVICE FOR CLEANING RECEPTACLES
                     Filed Jan. 4, 1927        14 Sheets-Sheet 7
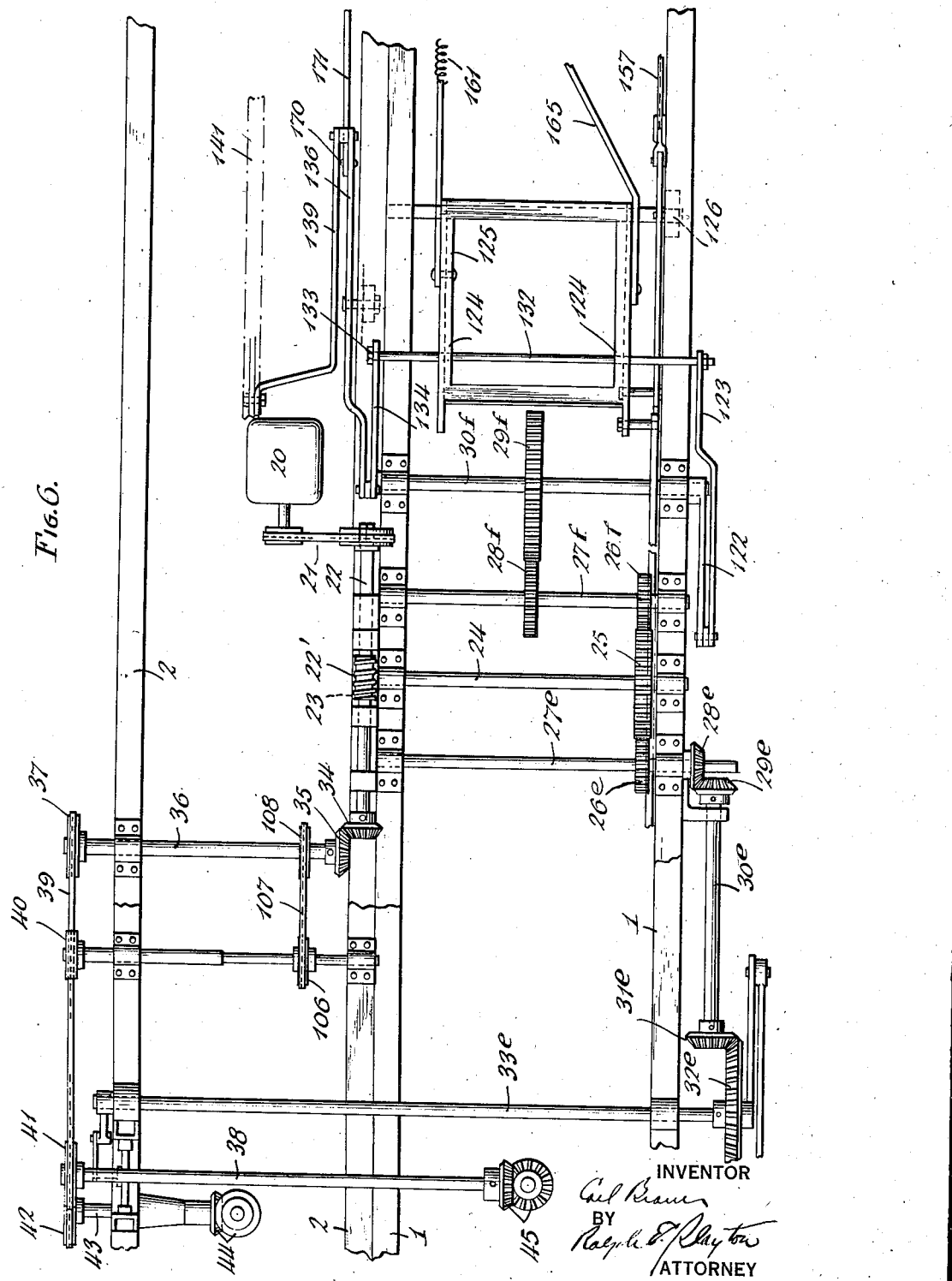

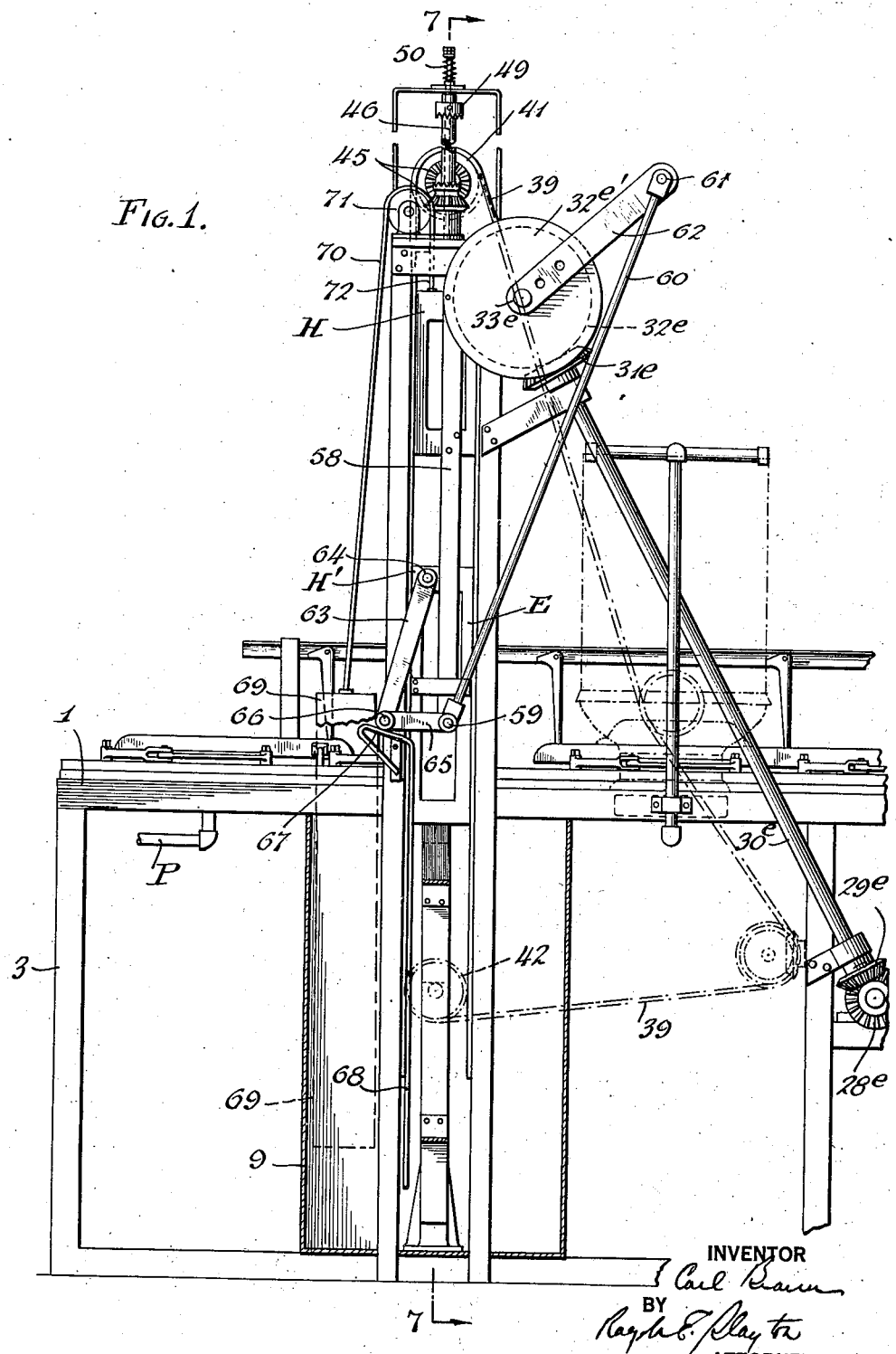

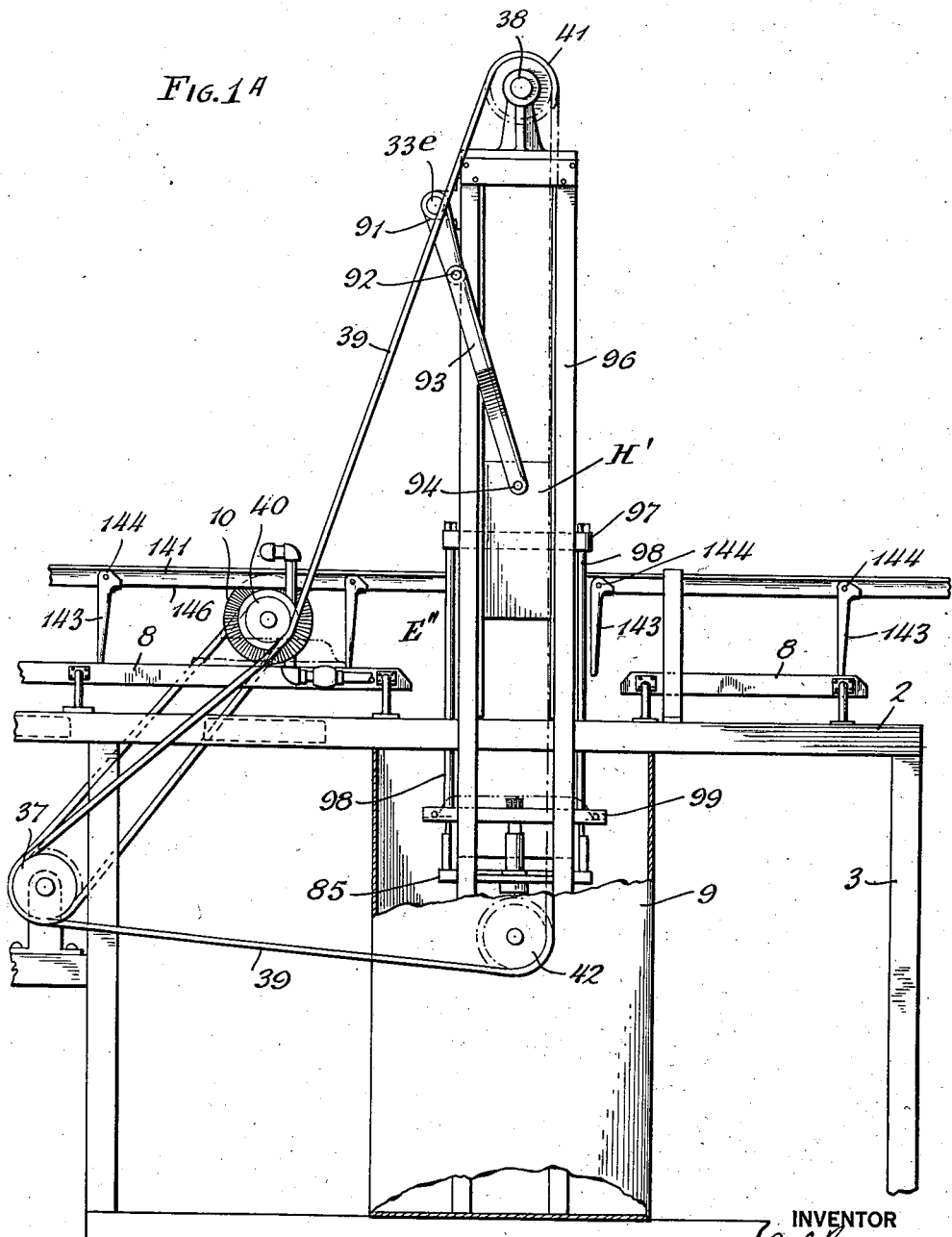

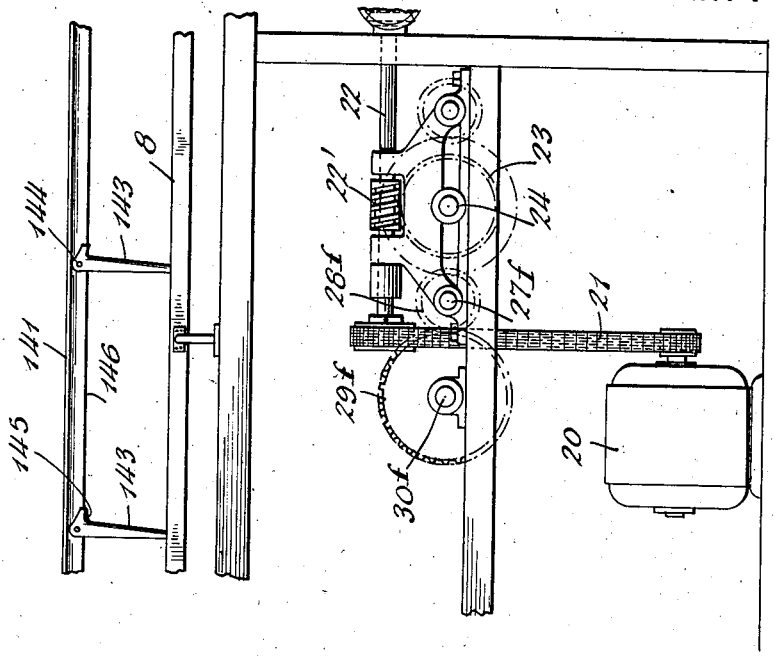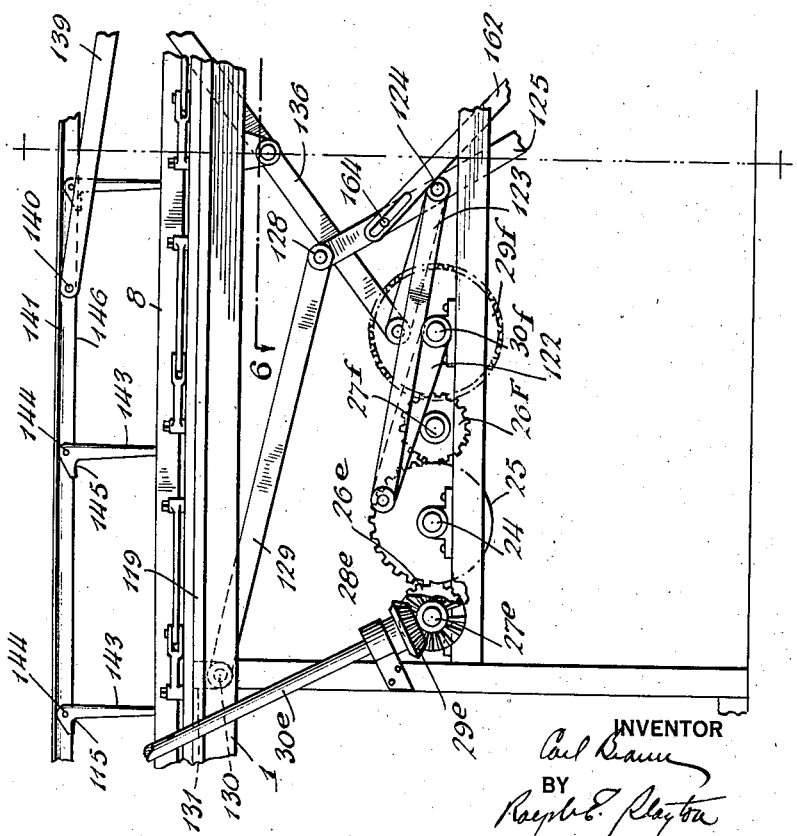

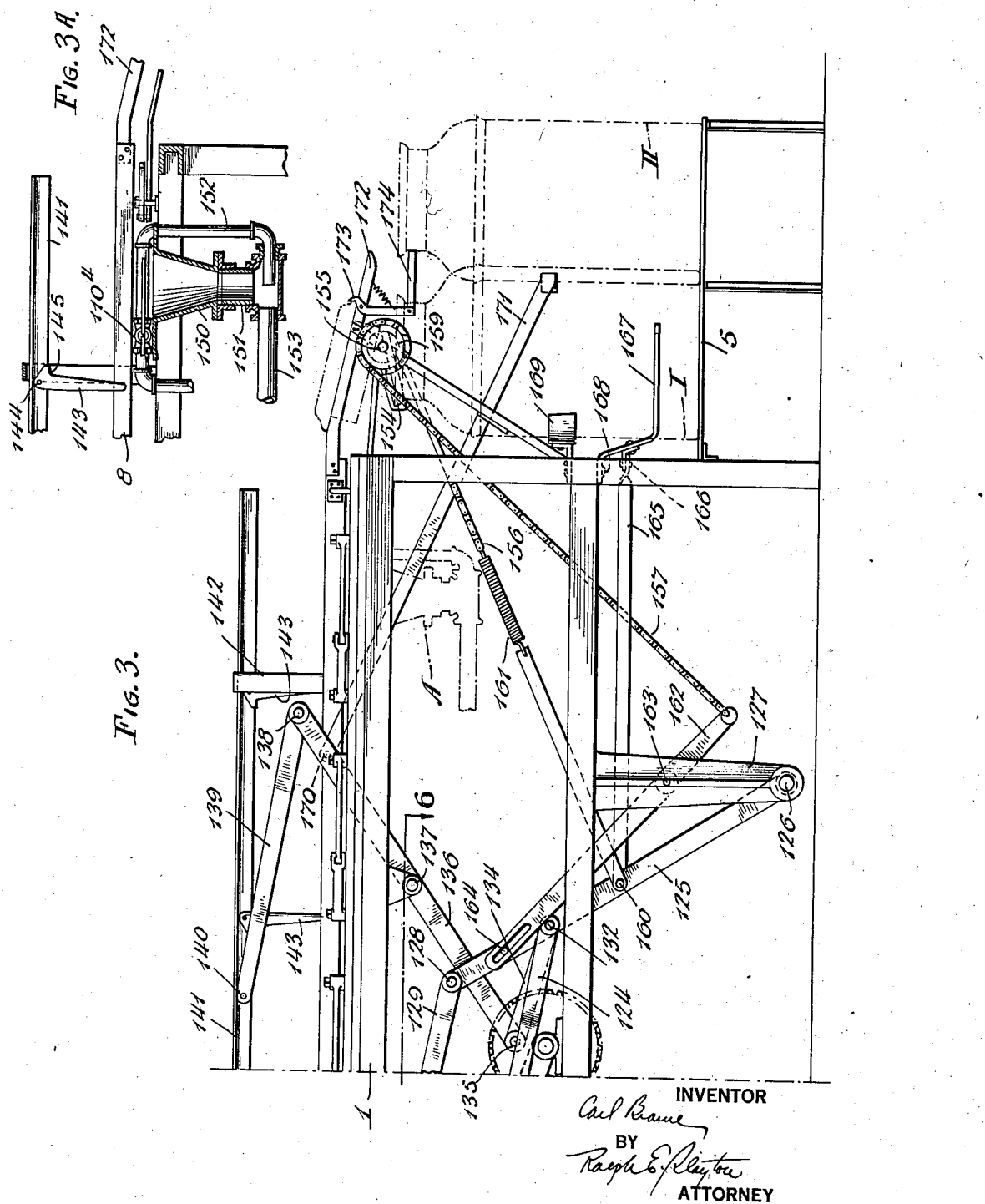

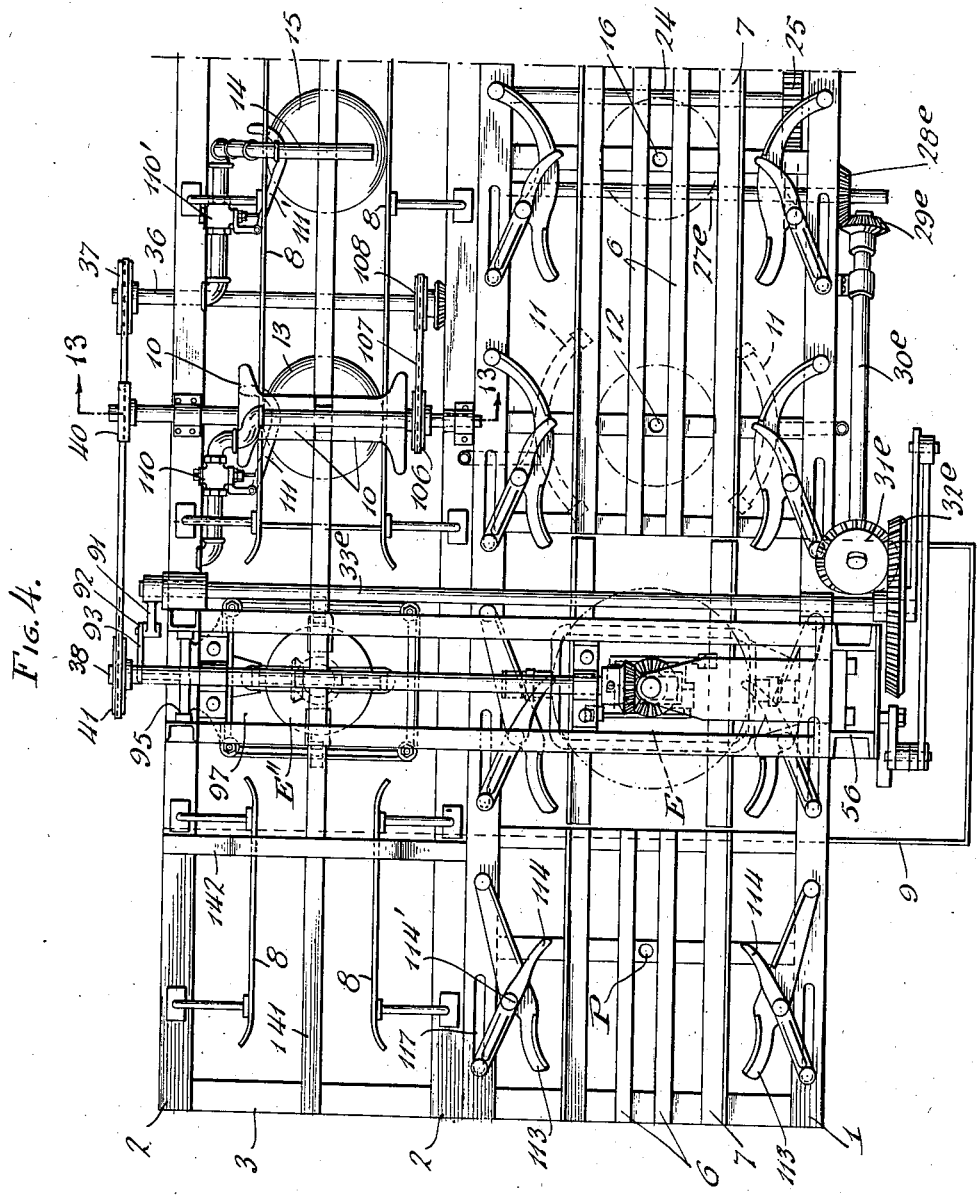

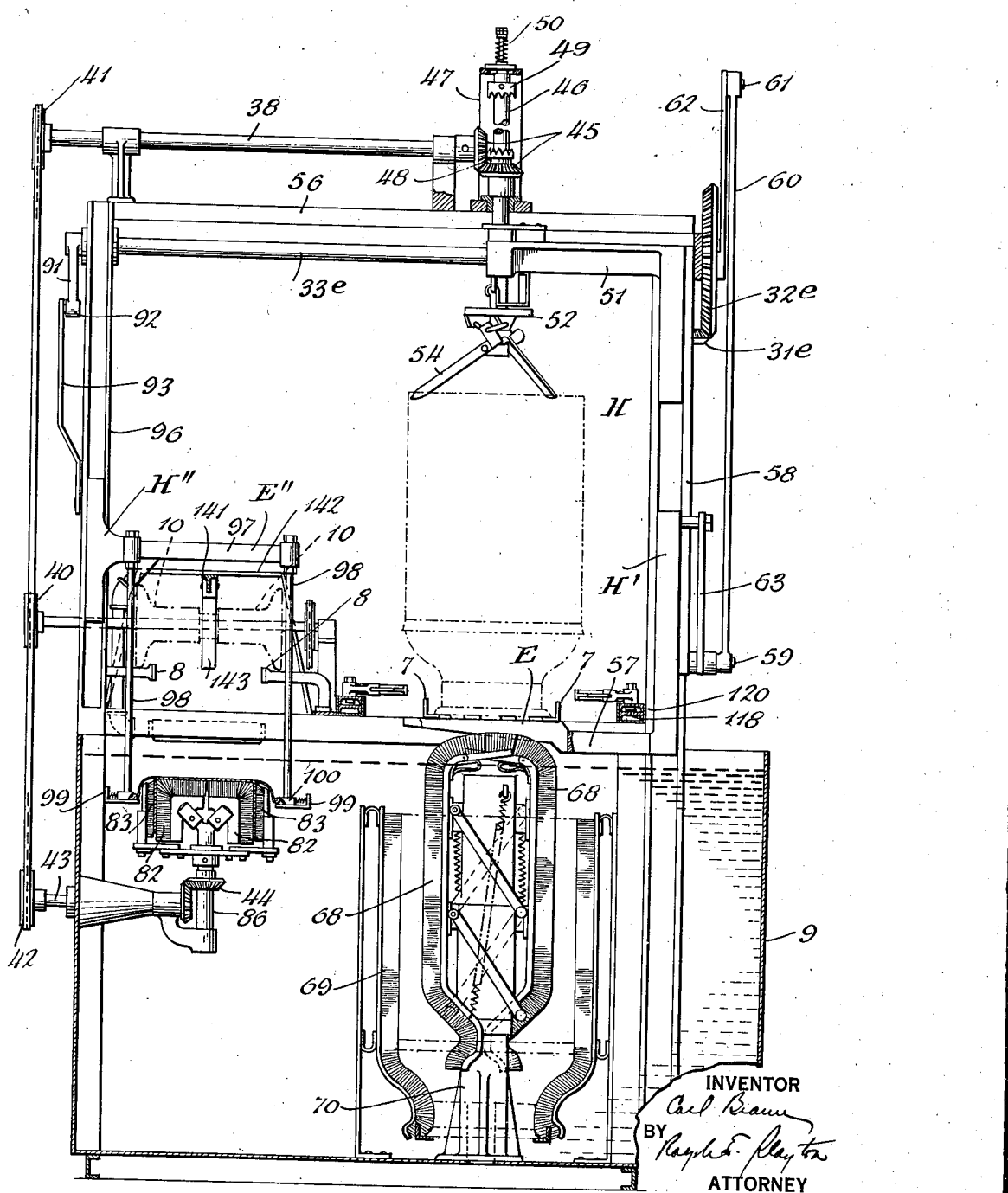

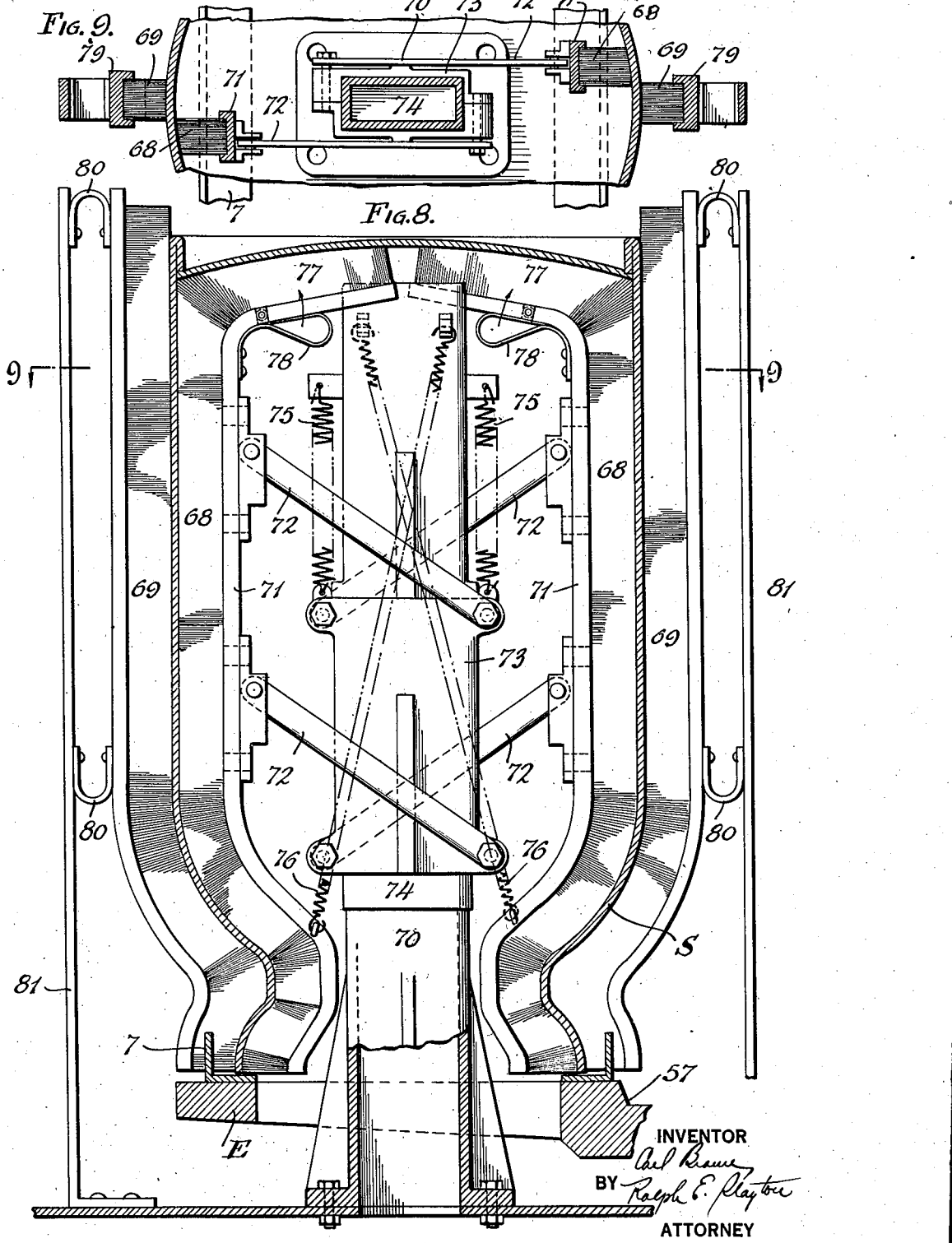

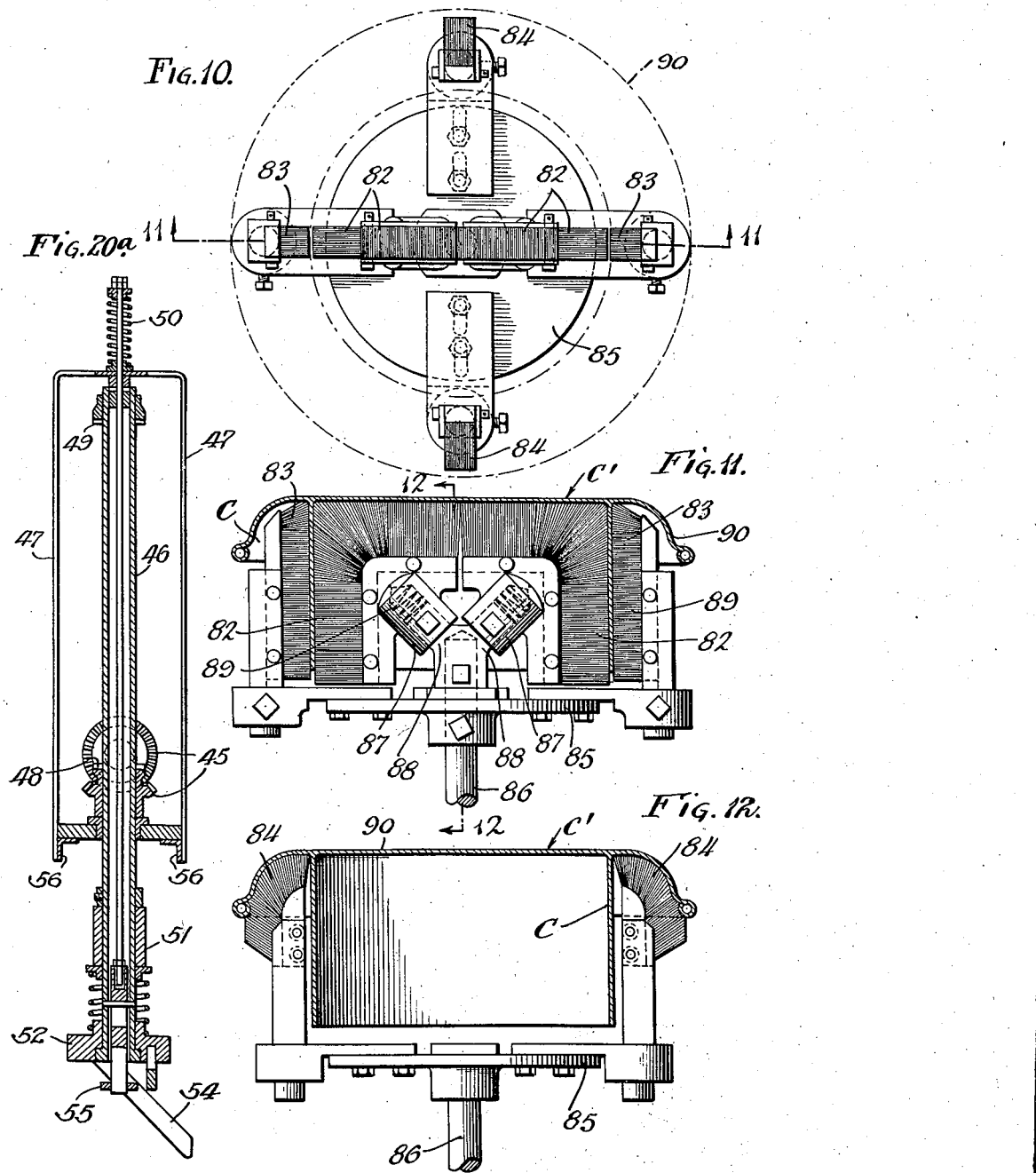

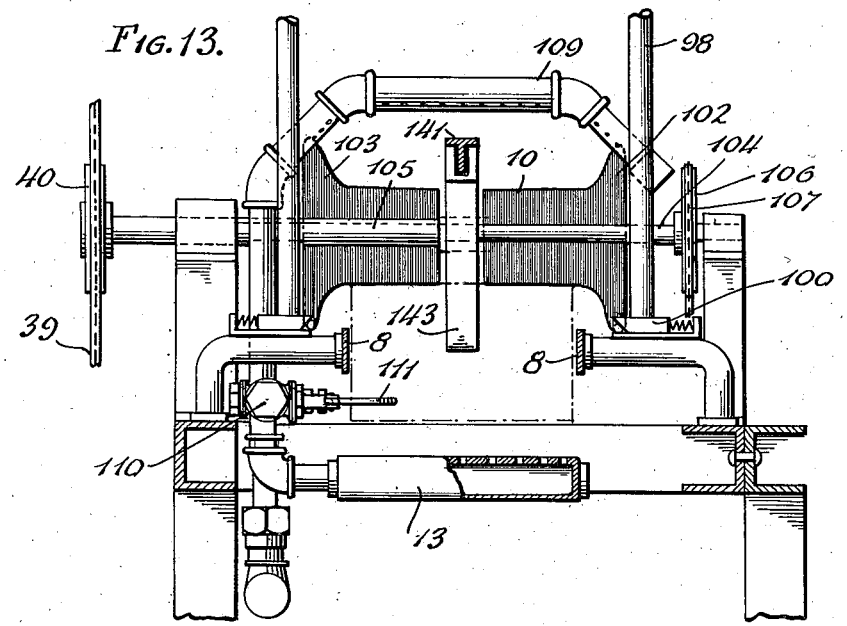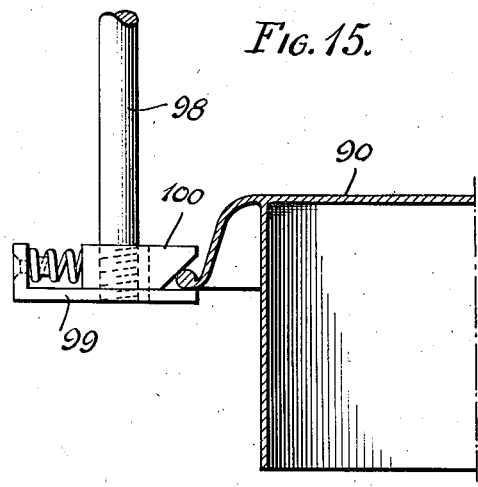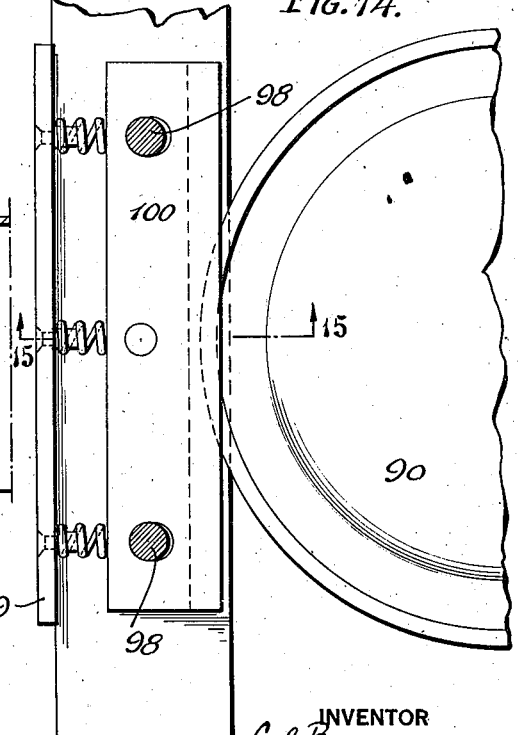

Oct. 22, 1935.  C. BRAUN  2,017,941
DEVICE FOR CLEANING RECEPTACLES
Filed Jan. 4, 1927   14 Sheets-Sheet 12
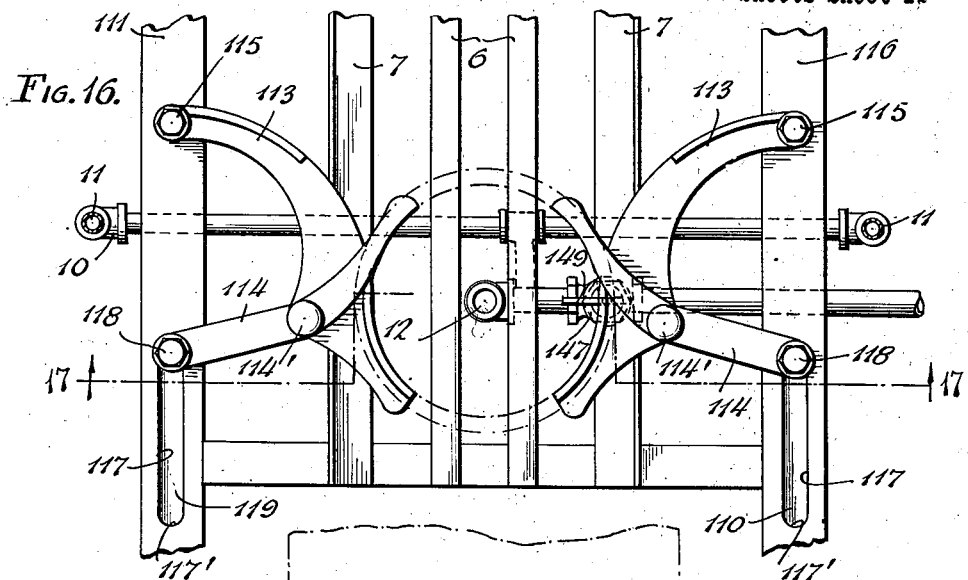
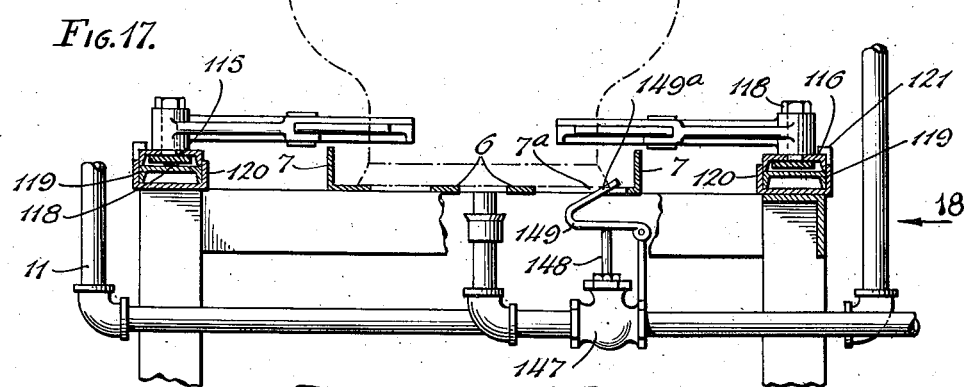
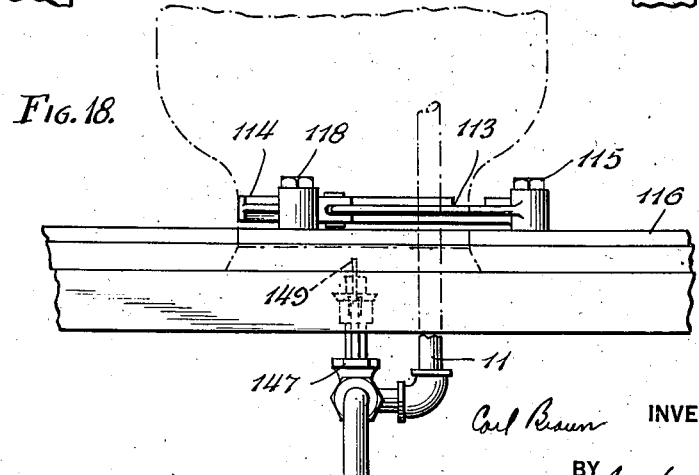
Carl Braun INVENTOR
BY Ralph F. Clayton
ATTORNEY Oct. 22, 1935.  C. BRAUN  2,017,941
DEVICE FOR CLEANING RECEPTACLES
Filed Jan. 4, 1927  14 Sheets-Sheet 13
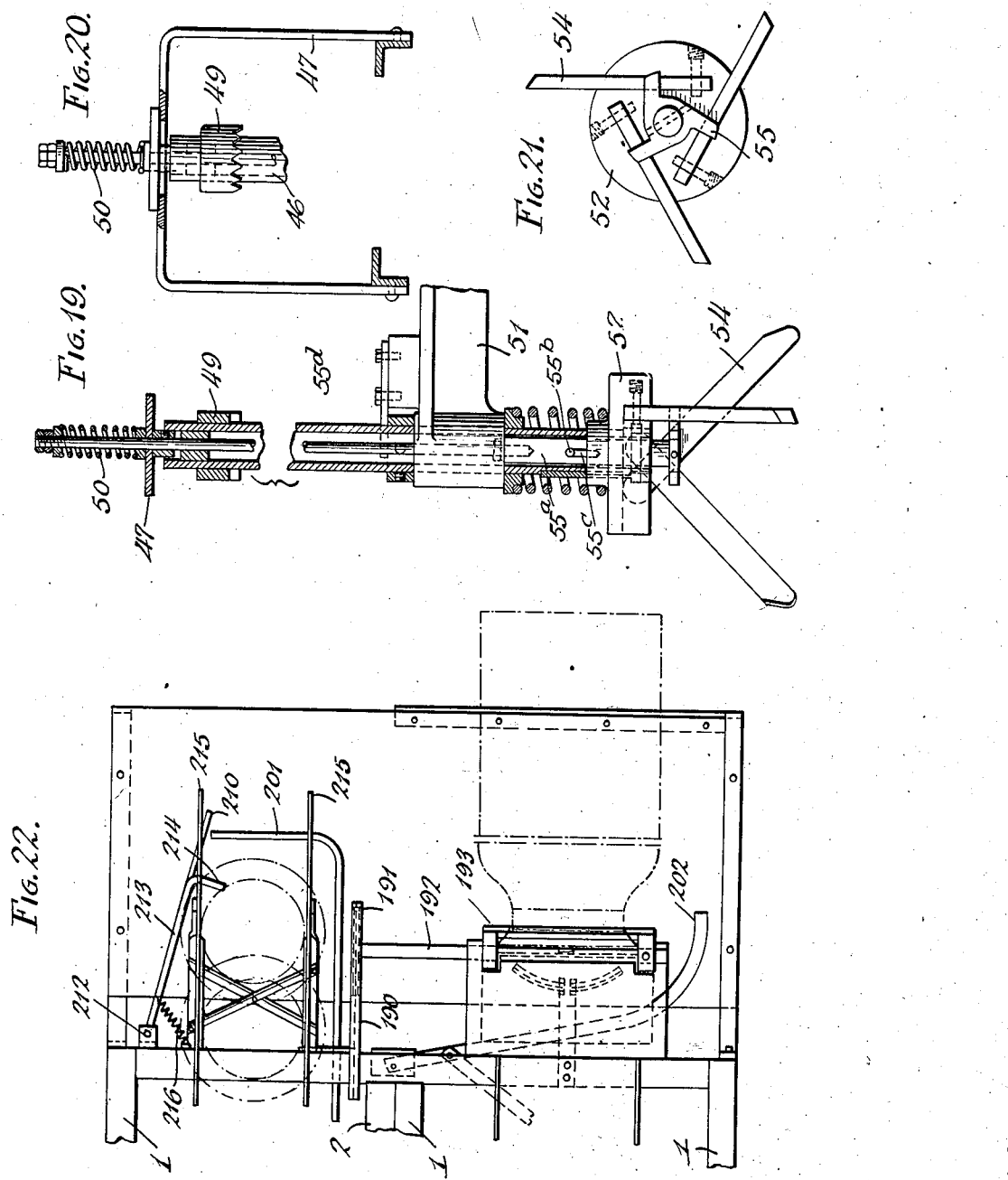

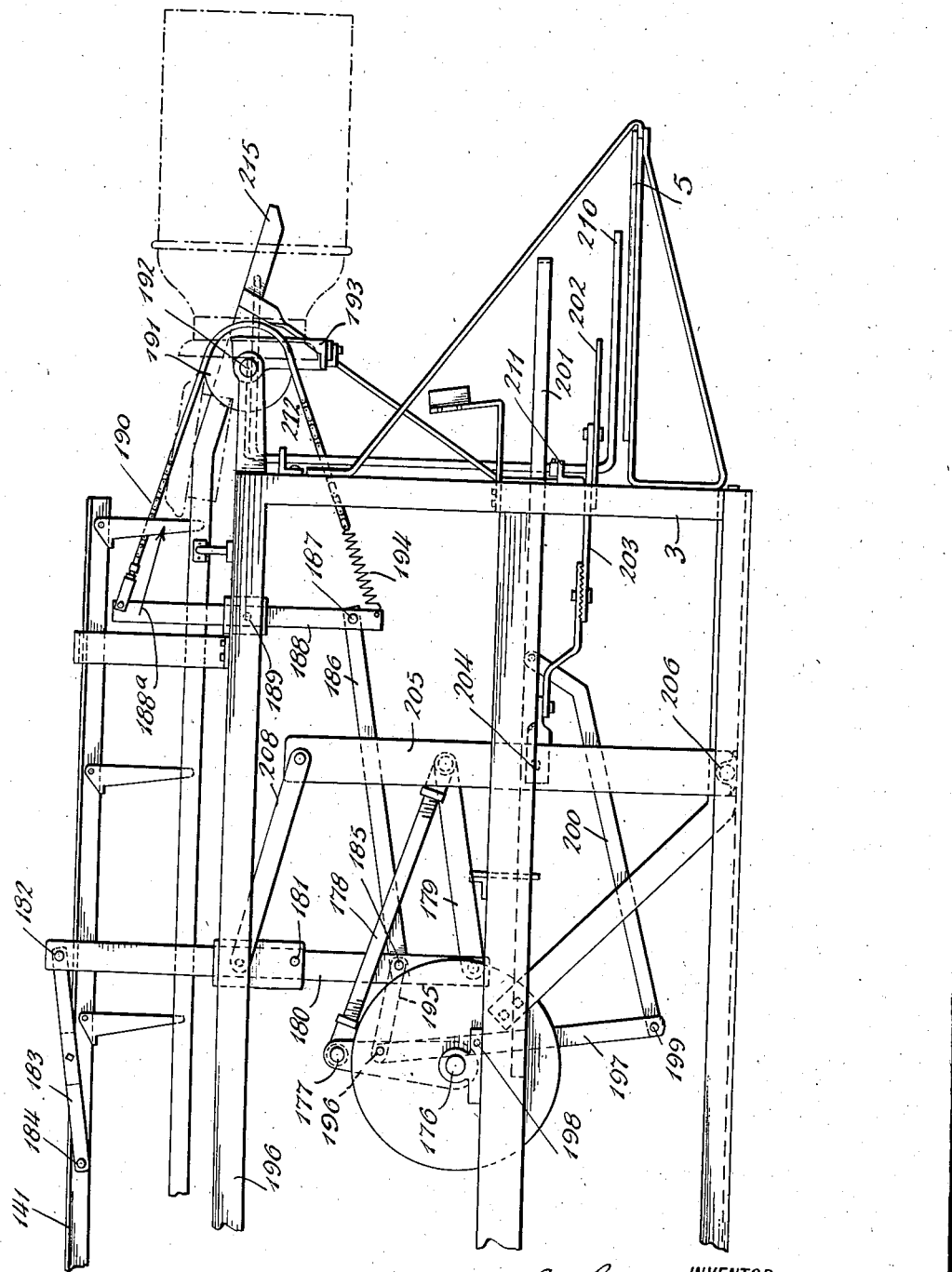

Patented Oct. 22, 1935

2,017,941

UNITED STATES PATENT OFFICE 2,017,941

DEVICE FOR CLEANING RECEPTACLES

Carl Braun, Canastota, N. Y., assignor to Carl Braun, Inc., Canastota, N. Y., a corporation of New York Application January 4, 1927, Serial No. 158,926

16 Claims. (Cl. 15—70)

The subject of this invention is an improved cleansing and sterilizing apparatus.

An object of the invention is to provide an apparatus of this type particularly adapted for the expeditious cleaning and sterilization of milk cans or their covers; and, preferably, an apparatus for handling both cans and covers while they travel simultaneously through the apparatus, say along parallel paths.

Another object is to provide an apparatus as already described, wherein both cans and covers proceed through the apparatus, and pass the one or more working stations provided relative to the cans and covers, in mouth-down condition; that is, with the cans substantially vertical but inverted, and with the covers flat and with their can-mouth engaging-flanges underneath.

Another object is to provide an apparatus as just described, wherein the cans and covers are positively advanced through their respective paths in such timed relation that, at the delivery end of the apparatus, a can is swung, preferably automatically, so as to bring its mouth-end toward cover-receiving position, at the proper instant for a cover to be moved, preferably automatically, toward reassembly with the can.

Another object is to provide, in a can cleansing and sterilizing apparatus, means, preferably automatic, for taking a can reaching the delivery end of the apparatus, and then swinging said can through a plurality of angularly related planes, to move the can from an inverted position toward an upright position, and also to move the can laterally of its previous line of travel relative to the apparatus.

Another object is to provide, in a cleansing and sterilizing apparatus adapted to act on hollow receptacles such as milk cans or their covers, an improved combination of instrumentalities for cleansing and sterilizing rapidly and efficiently a number of such receptacles in succession, while avoiding certain criticized inefficiencies of previously proposed brushing instrumentalities, and at the same time avoiding the troublesome, cumbersome and unsatisfactory presence and action of instrumentalities which clean by fluid action only.

Another object is to provide, in a cleansing and sterilizing apparatus for hollow receptacles, some of which may have a mouth of smaller cross sectional area than that of the cavity to be cleansed and sterilized as the result of a treatment including a brushing of the cavity walls, improved brushing means, in combination, preferably, with improved receptacle handling means for facilitating subjection of the receptacles to brushing action.

And, particularly in this latter connection, it is a further object of the invention to provide conveying or feeding means for a receptacle to be cleansed and sterilized, so operating, preferably automatically, that while one receptacle is being caused to descend for immersion in a cleansing liquid container, for subjection to a brushing action therein, another receptacle of the same kind, and constituting with the first mentioned receptacle, members of a train of like receptacles passing through the apparatus, is being propelled along substantially a horizontal path between the feed and the discharge ends of the apparatus.

Another object of the invention is to provide a compact, self-contained machine-unit for first automatically cleansing, sterilizing and drying milk cans and also their covers, separately, and then for automatically assembling the covers upon the cans.

Another object is to provide a unit as just described having a single power plant operating the various automatic mechanisms referred to.

Various other objects and advantages of the invention will be specifically pointed out or apparent hereinafter, in the course of a description of a preferred one of the various possible forms of the invention as shown in the accompanying drawings; it being understood, of course, that such form is merely illustrative of one combination and arrangement of parts calculated to attain the objects of the invention, pursuant to present preference, and hence the detailed description of such form now to be given is not to be taken as at all defining or limiting the invention itself. That is to say, the scope of protection contemplated is to be taken solely from the appended claims, interpreted as broadly as is consistent with the prior art, and with explanatory references to the specification only where a claim is ambiguous or to be impliedly limited beyond its express terms to avoid such art in order to save the validity of said claim.

In the accompanying drawings:

Fig. 1 is a side elevation of the can receiving end of the machine illustrated with the liquid tank shown in section;

Fig. 1a is a side elevation of the cover receiving end of said machine with parts of the liquid tank broken away;

Figs. 2 and 2a are fragmentary side elevations of the machine, showing respectively opposite sides of certain trains of operative connections;

Fig. 3 is a side elevation of the delivery end of the machine,—this view, with Figs. 1 and 2, showing the entire machine in side elevation at the can-handling side;

Fig. 3a is a detail view of an injector used in connection with means at drying stations for the cans and covers,—the approximate location of this device being indicated at A in Fig. 3;

Figs. 4 and 5 together constitute a complete top plan view of the machine;

Fig. 5a is a fragmentary side elevation of a portion of the discharge end of the device;

Fig. 6 is a top plan view of the main driving mechanism,—the observation plane for this view being that indicated by the line 6—6 partially shown in Fig. 2 and partially shown in Fig. 3;

Fig. 7 is a transverse section, taken on line 7—7 of Fig. 1;

Fig. 8 shows, on an enlarged scale, one of the brushing devices of Fig. 7;

Fig. 9 is a fragmentary-sectional view taken on line 9—9 of Fig. 8;

Fig. 10 is an enlarged top plan of the cover brushing devices shown in full lines in Fig. 7;

Fig. 11 is a vertical axial section taken on line 11—11 of Fig. 10;

Fig. 12 is a vertical axial section taken on line 12—12 of Fig. 11;

Fig. 13 is an enlarged transverse section, taken on line 13—13 of Fig. 4, showing the cover brushing devices illustrated in dot-and-dash lines in Fig. 7;

Fig. 14 is a fragmentary enlarged view in plan showing a detail of a cover-holding means;

Fig. 15 is a vertical section taken on line 15—15 of Fig. 14;

Fig. 16 is a view similar to Fig. 14, but showing a detail of the can-holding and propelling means;

Fig. 17 is a vertical section taken on line 17—17 of Fig. 16;

Fig. 18 is a side view, looking in the direction of the arrow 18 of Fig. 17;

Fig. 19 is a detail view of a part of the can engaging and spinning mechanism shown also in Figs. 1 and 7;

Fig. 20 is a detail view of an upper portion thereof, this view being at right angles to Fig. 19;

Fig. 20a is a detailed sectional view of a part of the can engaging and spinning mechanism shown also in Fig. 19 and partly shown in Fig. 20;

Fig. 21 is a bottom view thereof;

Fig. 22 is a top plan view of a modified form of the delivery end of the machine, over that shown to the right in Fig. 5;

Fig. 23 is a side elevation of the parts shown in Fig. 22.

Referring to the form of the invention shown in these drawings, the machine illustrated includes (Figs. 4 and 5) a pair of frame-tables 1 and 2, one carrying the mechanisms for handling the cans, and the other, the mechanisms for handling the covers.

Both tables are held together by end frames 3 and 4, and from the latter (Fig. 5) extends a platform 5 for receiving the sterilized cans. At the receiving end (Fig. 4) of the can handling side, there is a supporting grille 6 and a plurality of guide rails 7.

Similar rails for guiding the covers are shown at 8 at the cover handling side of the machine.

As shown best in Figs. 1, 4 and 7, a tank 9 is provided for say a soda solution, into which collection of liquid both the cans and the covers are lowered for immersion and mechanical scrubbing and then elevated for further travel at the main level toward the delivery end of the machine.

The mechanical cleansing of a can involves rotating the can itself, non-rotary brushes engaging the can from within and without; while, on the other hand, a cover is stationary during its brushing, the brushes here being rotary.

The under portions of a cover are scrubbed by means of a rotary brush arrangement while the cover is submerged in the liquid collection in tank 9 (see Fig. 7). The outer surface of the cover is brushed later, by a spool-shaped brush set indicated at 10 in Fig. 4 (see also Figs. 10, 11 and 12).

From the receiving end of the machine shown in Figs. 1 and 4, each can and cover before arriving at the brushing station, is given a preliminary inside milk-loosening rinsing through hot water pipe P (Figs. 1 and 4).

After cans and covers leave the tank 9 station, they are also somewhat dissimilarly handled.

A can, after leaving tank 9, is exteriorly rinsed (Figs. 1 and 17) by means of overhead water sprays conveyed through pipes 11, and is interiorly rinsed through a central pipe 12.

A cover, after leaving tank 9, is also rinsed, at its under surfaces, and this occurs while the cover's upper surfaces are being brushed and rinsed. This rinsing is accomplished by means of a stream of hot water directed through a circular spray-head 13 (Figs. 4 and 13).

At the next station (Fig. 4), the upper surfaces of the cover are sprayed by an overhead spray-pipe 14, and the lower surfaces of the cover are subjected to live steam issuing from circular jet-head 15.

At and beyond the point, each cover, and at and beyond the station 12 (Fig. 4), each can, is subjected to a sterilizing process as the result of successively passing over steam jets delivering live steam to the cavities of the two hollow receptacles (the cans and the covers). The steam jets for the cans are indicated at 16, 16' and 16" while the jet-plates for the covers are indicated at 15' and 15", (Figs. 4 and 5), and the dry-steam jets for the upper surfaces of the covers are indicated at 17 and 17' (Fig. 5).

Following sterilization of the inside surfaces of cans and covers, both are subjected to a drying process (Fig. 5). When a can reaches opening 18, and a cover reaches opening 19, a rapid exhaust of the can and cover cavities, causes complete drying of the receptacles.

The transfer of cans and covers from one stage to another is completely automatic, and is accomplished by a central-power-unit drive, the main elements of which are shown in Fig. 6. Motor 20, through chain 21, rotates shaft 22 and its worm 22' engaging a worm gear 23 fast on main cross-shaft 24, carrying a mutilated gear 25, which intermittently meshes with gears 26e and 26f fast, respectively, on secondary cross-shafts 27e and 27f.

The gear 26f and the elements driven from it operate the mechanisms for feeding the cans and covers from station to station along the main or substantially horizontal path of travel of the receptacle, and to emphasize this, certain of said elements more adjacent to the gear 26f are given composite reference characters including a numeral followed by the letter f; while the gear 26e and the elements driven from it operate the mechanisms for raising and lowering the cans and bodies at the tank 9 station shown in Fig. 7, and to emphasize this, certain of said elements are given composite reference characters including a numeral followed by a letter e.

The mutilated gear 25 results in all these mechanisms last referred to operating intermittently, while certain other devices cooperate with the mutilation of such gear in operating the mechanisms effecting movements of the cans in certain timed relations to the operation of the mechanisms effecting the movements of the covers.

On shaft 27e is keyed a bevel gear 28e, engaging a bevel gear 29e fast on inclined shaft 30e (Figs. 6 and 1), at the upper end of which latter shaft is a bevel gear 31e, which engages a large bevel gear 32e fixed to a disc 32e' and to an overhead shaft 33e which operates a crank, link and lever arrangement hereinafter described in detail and for operating what will be termed the elevator E portions of which are thus marked in Figs. 1, 7 and 8.

As seen in Fig. 6, keyed to the main shaft 22 is a miter gear 34, engaging a similar gear 35 keyed to shaft 36 carrying a sprocket wheel 37, from which power is continuously supplied to an overhead cross-shaft 38 by means of a sprocket chain 39, which, as shown best in Figs. 1a, 4 and 7, runs also over sprocket wheels 40, 41 and 42.

Sprocket wheel 42 rotates with shaft 43, which in turn operates, by means of miter gears 44, a rotary brush 45 for scrubbing the lower portions of a cover.

Shaft 38 (Figs. 1 and 7) actuates, through miter gears 45, a vertical shaft 46 guided in a frame 47. Shaft 46 is slidable through the horizontal miter gear, 45, which latter is equipped with a clutch member as indicated at 48. A corresponding clutch member is secured to shaft 46 as indicated at 49. An end-thrust spring means is provided for the top of shaft 46 as indicated at 50. An irregularly shaped stop plate 55 comprising three arms is pinned to a mandrel 55a vertically movable within the lower end of shaft 46 but constrained to rotate therewith by pin 55b projecting inwardly from shaft 46 and riding in slot 55c found in mandrel 55a. The mandrel is attached to the lower end of rod 55d, the upper end of the latter being resiliently pushed upwardly from member 47.

At the lower end of shaft 46, which is supported by an arm 51 (see Figs. 7, 19, 20 and 21) is provided a spring-controlled tridental device comprising prongs 54 for bite-engaging the inverted bottom of a can; this device including a chuck 52 suspending three teeth or prongs 54 as the arm 51 and its bearing move down to bring the tridental members 54 to a position where they spread and engage the can rim. The chuck 52 moves with the hollow shaft 46 and the clutch member 49 engages the clutch member 48 which is loosely mounted on the hollow shaft 46 and is rotated by means of gears 45 and as the clutch members 48 and 49 engage, the shaft 46 is locked to the rotating gears whereby the shaft 46 rotates the chuck 52 and tridental device comprising prongs 54 is rotated.

Let us now refer to details of the elevator E, and thus principally to Figs. 1 and 7, noting in this connection that the frame 47 guiding shaft 46 is secured to a bridge support 56 just above shaft 33e, that this bridge is supported at the tops of a pair of columnar structures 96 at opposite sides of the machine guiding cross heads H, H' and H" (which last-mentioned cross head will be later referred to in describing the cover elevator E"), that the cross head H carries an offset arm 51 within which vertical shaft 46 is rotatable but not slidable, and that cross head H' carries an offset arm 57 forming the elevator proper. Secured at its top to cross head H is a draw-bar 58, and to the lower end of this bar, at 59, is pivoted a link or connecting rod 60 pivoted at 61 to a crank arm 62 secured to disc 32e'. Cross head H', above arm 57 carrying elevator proper E, has mounted thereon a link 63, pivoted thereto at 64; and a link 65, connected at one end to the pivotal point 59, is pivoted to said link 63 at 66.

In order to defeat unintended operation of the parts, due to trouble-creating or wrongly staggered relations of the pivotal points 64, 66 and 59, during down thrusts and up pulls of the connecting rod 60 consequent upon each complete revolution of disc 32e', there are provided, as shown in Fig. 1, a ramp 67 and a vertical rail 68, for guiding the pivotal point 66 during upward and downward travels of cross heads H and H'.

The arm 51 for vertical shaft 46, and the crosshead H, are balanced by a counter-weight 69. The latter is connected, by a cable 70 passing over a pulley 71, to arm 51, as indicated at 72.

When vertical shaft 46 is brought down so that the clutch portions 48 and 49 meet, the shaft 46 commences to turn since miter gears 45 are continuously rotating. Shaft 46 is thus lowered directly connected with arm 51. This arm is lowered during rotation of gear 32e, brought about at the proper time by mutilated gear 25 engaging gear 26e; connecting rod 60 then operating draw-bar 58, to lower cross-head H and arm 51.

While vertical shaft 46 is being lowered, the elevator proper E on cross-head H' remains stationary, elements 63 and 65 first resting on ramp 67. Meanwhile, of course, a can has been positioned on elevator proper E as shown in Fig. 7. As vertical shaft 46 descends toward the bottom of the can (such bottom now at the top of the inverted can), prongs 54, resiliently rockably suspended, engage the can bottom, then glide over the surface of such bottom toward the outer edges thereof, and finally cause the pointed lower ends of the prongs to bite into the inner wall of the bottom marginal flange, whereupon, the clutch parts 48 and 49 coming into engagement, the can commences to rotate on the elevator.

Once the motion of crank-arm 62 has progressed to a position symmetrical to that shown in Fig. 1, the descent of arm 51 will commence.

The moment of descent of arm 51 is so timed relative to that of arm 57, that when the crosshead H descends far enough to contact crosshead H', both move together in a downward direction. This is accomplished by levers 63 and 64 being drawn into a straight-line assembly, as connecting rod 60 continues its down thrust. As lever 63 snaps clear of ramp 67, the elevator proper E commences also to descend.

In the tank 9, filled with a suitable cleansing liquid is arranged a brushing arrangement including inner brushes 68 and outer brushes 69, as shown in Figs. 8 and 9.

The inner brushing device includes a standard 70 at each side of which is mounted a brush frame 71 supported by quasi lazy tong members 72. These members 72 are attached to a sleeve 73 upon a reduced upper portion 74 of standard 70; the sleeve being resiliently slidably suspended by springs 75. The lower portions of brush frames 71 are also spring-suspended as indicated at 76.

Normally the brush frames 71 are drawn upward by their springs and are positioned closely together toward the axis of standard 70. When the brush frames are thus collapsed, and downward pressure is exerted upon the hinged upper portions 77 of the brush frames, the latter are forced down and spread against leaf-springs 78 and the brush-frames are expanded as shown, while these brush-frames, in their normal collapsed condition, will readily pass through the neck of the can and up all the way into the can cavity, to cause the bottom of the can to bear down on upper frame portions 77, and thereby automatically to expand the brush-frames as just explained.

The outer brushing device for the can includes brush frames 79 resiliently supported by U-leaf-springs 80 on standards 81, said frames carrying the brushes 69.

Brushes 68 and 69 are shaped to conform, when engaging the can, to the inner and outer contours of the latter; while the resilient and/or multi-articulate brush-mountings permit thorough scrubbing of surface irregularities such as dents, bulges and the like.

Thus when the can, gripped by prongs 54, and clamped between the arms 51 and 57 of the cross-heads H and H', is immersed in the liquid in tank 9, and with clutch members 48 and 49 engaging, the can is rapidly rotated relative to the brushes 68 and 69, a thorough removal of solid matter contained within the can is accomplished, and perfect scrubbing is accomplished in respect to every can, dented or not, going through this stage of the process.

Ascent of the can on elevator E takes place as follows: First, the connecting rod 60 elevates both the arms 51 and 57, and the can with them also, until the latter again attains the elevation shown in Fig. 7. From then on, arm 51 moves upward by itself, the elements 64 and 65 (Fig. 1) having snapped back onto the ramp 61 as illustrated. Also as vertical shaft 46 rises with arm 51 clutch members 48 and 49 are disengaged and the rotation of shaft 46 ceases, the spring 50 lifting or easing shaft 46, thereby causing prongs 54 to clear away from the can and so freeing the latter for transport horizontally to its next position, that indicated in broken lines in Fig. 1.

The parts are so timed that while a can is being made ready, after scrubbing in tank 9, to be restored to the position shown in Fig. 7, a cover is being scrubbed in the tank 9 at the end of the latter underlying the line of travel for the covers; or, in other words, a can is always a station, or step, ahead of a cover; so that, when the two receptacle parts are to be reassembled at the delivery end of the machine, a time interval is provided for the restoration of the can, from its inverted position while in the apparatus, towards its upright position, during which interval the cover is receiving a predetermined final treatment. This timing of the parts also has the advantage that, if cans and covers are to be manually disassembled at the feeding end of the machine, and manually fed into the machine, the cover for a can, and that can, may be fed in separately, and in the order stated, which is most natural and convenient.

Referring now particularly to the scrubbing and elevating means for a cover, abreast of the scrubbing and elevating means last above described, for a can,—and referring to Figs. 1a, 4, 6, 7, 10, 11, 12, 14 and 15, shaft 36 (Fig. 6) actuates, through chain 39 and sprocket 42, the rotary brush arrangement in Figs. 1a and 7; this equipment including, as best shown in Figs. 10 to 12, inner brushes 82, outer brushes 83, and under-cap brushes 84, all mounted on a disc 85 fixed on a vertical spindle 86, but with inner brushes 82 carried on two cups 87 secured on Y-arms 88 and urged outward axially of the arms by springs 89.

From Figs. 10, 11 and 12 it will be seen that the brushes 82 and 83, and the brushes 84, are disposed in two diametrical planes which intersect; and thus rotation of disc 85, against a non-rotating cover, causes all three sets of brushes simultaneously to act on the cover and thus at one operation, or stage, scrub every portion of the entire cover excepting only the top surface thereof indicated at C' in regard to the covers marked C in Figs. 11 and 12.

These brushing operations just described are performed while a cover is immersed in the liquid in tank 9, after having been brought down to this position by the cover elevator; which elevator, and certain of its attendant devices, will now be described.

Overhead shaft 33e (Figs. 6, 7 and 1a) rotates a crank-arm 91 pivoted at 92 at its lower end to the upper end of a link 93. This link is pivoted at its lower end to cross-head H'', at 94, having an extension 97, which, together with rigid suspension rods 98 for a pair of angle iron sections 99, carrying spring-operated wedge clamps 100 (shown more in detail in Figs. 14 and 15), constitutes the elevator proper E''. It will be clear that incidental to each complete revolution of overhead cross-shaft 33e, a can cover, received on elevator E'' from the rails 8 at the right in Fig. 1a, is lowered to immersion in tank 9, and scrubbed as to certain of its surfaces, and then raised for delivery to the rails 8 at the left in Fig. 1a,—cross-head H'', and the cover elevator E'', being halted, by the timing of the mutilated gear 25 of Fig. 6, each time the elevator reaches the level of rails 8 and the level of brush equipment 45, just as the can elevator E is similarly halted at its upper and lower levels.

Scrubbing of the top surface C' of the cover marked C in Figs. 11 and 12, which as above expained was the only cover surface not scrubbed during immersion of the cover in the liquid in tank 9, occurs after the cover has passed along the rails 8 to the left in Fig. 1a, to the next position, that indicated by the jet-plate 13 in Fig. 4, over which the cover comes to rest momentarily.

Overlying this jet-plate is a rotary brush 10, spool shaped and, as shown in detail in Fig. 13, including two complemental brush-members 102 and 103, the former fixed on a shaft 104 and the latter on a hollow shaft 105 sleeving shaft 104; these shafts being continuously rotated in the same direction by the chain 39 and a chain 107 engaging the sprocket 40 and a sprocket 106, fixed respectively on the shafts 105 and 104, the chain 107 passing also over a sprocket 108 fast (Fig. 4) on the same cross-shaft 36 which carries sprocket 37.

As seen in Fig. 13, the lower portion of the cover, indicated in dot and dash lines, is guided, while passing under the brushes 102 and 103, between rails 8, which are mere strips, and not angles, as are the rail-sections 99 of the cover elevator and as are the rails 7 at the main level for the cans.

Above brushes 102 and 103 is a perforated pipe 109 which permits cleansing fluid to reach the top surface of the cover during scrubbing. Simultaneously through the jet-plate 13 below, hot water is directed against all the other and previously scrubbed surfaces of the cover.

The fluid supply for both the pipe 109 and the jet-plate 13 is controlled by means of valve 110. This valve may be a so-called "whistle" valve, of the quick opening type, having a spring within the valve housing normally holding the valve shut and a wipe-lever 111 extending into the path of the moving cover, so that when the cover comes into position, the valve is opened, and during the rest of the cover at such position, the valve remains open.

There have now been described all the various scrubbing operations, to which the cans and covers are subjected in the machine illustrated in the drawings.

Both cans and covers are automatically intermittently moved forward and halted at their various stations at the main level of the rails 7 and 8 as long as required for each successive operation.

Adverting to the can advancing mechanism just referred to, and examining in this connection Figs. 4, 5, 16, 17 and 18, each can entering the machine is placed upon the rails 7 and grille 6 of Fig. 4, just ahead of the hot water pipe P, and so as to come within the field of operations of the first set of pairs of claws 113 and 114, the pairs of claws forming this set being respectively at opposite sides of the can.

The claws 113 and 114 of each pair are pivoted together at 114'.

There are seven pairs of these claws 113 and 114, at suitable intervals along the length of the apparatus, at each side of the line of travel of a can through the machine, as shown in Figs. 4 and 5.

As illustrated best in Fig. 16, when compared with Figs. 4 and 5, each claw 113 at each side of said line of travel is pivoted at 115 to an upper slide-bar 116 having longitudinal slots 117 along each of which is movable a stud or pin 118 pivotally mounting an end of a claw 114. Each of these pins 118 is secured to a lower slide bar 119. Both slide bars are guided for endwise movement in a channel 120, carrying at intervals retention lugs 121 holding the slide bars against displacement from the channel.

In order to move bars 116 and 119 intermittently and in predetermined time relation, the following arrangement is provided:

Referring to Figs. 2, 3 and 6, it will be noted that mutilated gear 25, operating shaft 30f through the gears 26f, 28f, and 29f, also operates a crank 122 keyed on said shaft, and thereby a link 123. The latter is pivotally connected at 124 with an inclined rocker-frame 125. This frame 125 is pivoted at 126 to hangers 127. At each side of the upper end of frame 125 is pivotally connected at 128 a link 129 which is also pivoted at 130 to a lug 131 connected with the lower slide bar 119 at that side of the can table 1.

Assuming that claws 113 and 114 are in the positions shown in Figs. 4, that is, in spread or can-clearing condition, link 129 is moved forward, and bar 119 and claws 114 are given similar movements toward the delivery end of the apparatus. The claws 114 now move in toward the center of the table 1; and since the movements of the claws 114 control the movements of claws 113,—slide bars 116 standing fast,—all claws 113 and 114 are thrust in toward the center of table 1 and contracted as shown in Fig. 16 and seize the neck-portions of the cans opposite the same. At this instant the pins 118 reach the forward ends of slots 117 in slide bars 116, and now all bars 116 and 119 move together for the remainder of the forward movement, which fractional thrust is that required to move a can positively from one station to the next.

When link 129 has passed its extreme forward position, it is drawn back, retracting with it slide-bars 119 and the pins 118. This opens up the claws 114 and 113, and they become restored to their spread positions shown in Fig. 4. As the pins 118 engage the rear ends 117' of the slots 117, in the upper slide bars 116, the slide bars 119 pick up the slide bars 116, and all bars are returned to the positions shown in Fig. 4; claws 113 and 114, being spread, having cleared all the cans they had previously transported in a forward direction.

As mechanisms for automatically intermittently moving the covers forward from one position to another, and for halting them successively at such positions, the following parts are provided:

Referring to Figs. 2, 3, 5, 6 and 7, and recalling that the cross-shaft 30f serves, for the purpose of operating the can-feeding mechanisms previously described, to oscillate intermittently the rocker-frame 125, note that the pintle element for the power-applying pivotal connections 124 on the rocker frame, comprises a cross rod 132, connected at one end as shown in Fig. 6 to the link 123 for oscillating the rocker frame for the purpose just stated. The opposite end of rod 132, at 133, is pivoted to a link 134; which link is pivoted at 135 to a lever 136 fulcrumed at 137 (Fig. 3). The upper end of this lever is pivoted at 138 to a draw-link 139 pivoted at 140 to a T-slide-rail 141 elevated above the center of the main level travel of the line of covers, as shown best in Figs. 5 and 7.

This T-slide 141 is held to reciprocation back and forth along said line, by a proper number of suitable overhead bridge guides one of which is indicated at 142 in Figs. 3 and 5.

As shown in Figs. 2, 3 and 7, suspended from the central vertical rib of T-slide 141, are pawls 143 which are swingably mounted on pivots 144 but which are bifurcated at their upper ends so as to locate below the said rib a stirrup 145 to limit the pawls to a one-direction swing only.

There are one of these pawls 143 for each station for a cover along its line of travel at the main level through the apparatus.

When link 139 is drawn forward, the pawls 143 engage rear points on all the covers immediately ahead and slide them forwardly between rails 8. When this forward movement is ended, and the T-shaped slide 141 is moved backward, the pawls 143, being free to swing in a forward and upward direction when they meet the covers immediately behind said pawls, will thus be permitted to clear the just previously advanced covers, and so all the parts will be restored to normal ante-feed position, ready for the next advance of all the covers.

It has already been explained in connection with the valve 110 of Fig. 13, how the arrival of a cover at a station at the main level whereat said cover is to have applied thereto a momentary fluid discharge, automatically temporarily opens such supply; it of course being understood that a valve equivalent to the valve 110 is at each of such stations.

Similarly, the cans themselves automatically perform the same function relative to the fluid discharge, on the arrival of a can at each station at the main level whereat the fluid application is to occur.

In Figs. 16, 17 and 18 are shown the details of such a valve 147 which is also of the quick-opening type. The valve 147 here illustrated, controls the fluid supply to pipes 11 and 12. The stem 148 of the valve is depressable by a shaped-strip lever 149, so positioned as to extend an upper inclined surface 149a through a cut 7a in a rail 7 into the path of an oncoming can in such manner that the fluid supply acts on the can at any station as intended. The cans, at each of the stations 16, 16' and 16" of Figs. 4 and 5, are similarly automatically subjected to live-steam discharges; such treatments acting cumulatively to insure perfect sterilization of every can.

Each can, further, at the last position prior to its discharge from the apparatus is subjected to a rapid drying process, on arriving at the station 18 of Fig. 5. At this point the moisture within the can is rapidly exhausted, by a steam operated ejector shown in detail in Fig. 3a. The latter includes a funnel-shaped member 150 connected with an ejector 151, which is operated by means of steam passing through pipe 152 into a larger pipe 153, thereby setting up a vacuum action to extract all moisture within the can.

Similarly, the covers, at the opposite side of the apparatus, after their final scrubbing at the station indicated at 13 in Fig. 4, pass through live-steam sterilization stations as indicated at 15 in Fig. 4 and at 15' and 15" in Fig. 5, and finally pass through the vacuum dryer station indicated at 19 in Fig. 5. The automatic fluid control valves at these stations, similar to the valve 110 described hereinabove in connection with Fig. 13, are indicated respectively at 110', 110", 110³, 110⁴.

At the station 19 of Fig. 5 each cover is subjected to its final rapid drying process by a steam-operated ejector similar to that indicated at 150 in Fig. 3a and already described in detail in connection with the final rapid drying process applied to a can at the station 18 of Fig. 5.

The apparatus, from the elevators to the drying station, is desirably enclosed within or hooded by a vapor-confining chamber (not shown).

Each can on leaving the drying station reaches the discharge end of the apparatus. And here the can is brought from its inverted position to normal upright position, to reach that position in time to receive its cleansed and sterilized cover.

Refer now to Figs. 3 and 5.

Each can, as it begins to clear rails 7 at the right end of Fig. 5, is to be lowered to landing platform 5, and simultaneously somersaulted from its inverted to an upright position as indicated at I, and then laterally shifted to a position II on the platform.

This handling of the cleansed and sterilized can is prepared for by the movement of the inverted can off the main platform of the apparatus, causing the neck portion of the can to enter a flexible C-shaped supporting collar 154 fixed for rotation on cross-shaft 155 by an arm 155a, having one end keyed or otherwise secured to the cross-shaft 155 and having its other end secured in any convenient manner to the collar 154 so that the ends on the open side of the latter are free to clip the can neck and support it during the uprighting step; such collar then being displaced 180° from its position shown in Figs. 3 and 5, that is, so that it lies substantially in a horizontal plane but with the mouth of the C facing the oncoming can-neck. The cans are carried over the intervening space between the can guideway and the position where the cans are clipped by the supporting collar 154 on any suitable plate or platform, which may be similar to that shown in Fig. 22.

Shaft 155 is a rock-shaft, operated in opposite directions alternately, with intervening pauses, by chains 156 and 157 engaging sprockets 158 and 159 on the opposite ends of the shaft. Chain 156 is connected at 160 with rocker frame 125 by means of a spiral spring 161, which latter provides for a certain flexibility of operation of the device. Chain 157 at its upper end is wrappingly secured to its sprocket, and the lower end of this chain connects with a lever 162 fulcrumed at 163 to one of the hangers 127. The upper end of lever 162, which is slotted, engages a pin 164 on the rocker-frame. When frame 125 is rocked toward platform 5, chain 157 is pulled and collar 154 is swung through 180° to can-neck receiving position. At the same time, chain 156 is slackened. At the instant the can is fully home in the support 154, rocker-frame 125 moves back to the position illustrated, slacking chain 157 and pulling chain 156, thereby tumbling the can to the position I on platform 5.

Pivoted to rocker-frame 125, also at the point 160, is a link 165 which is pivoted at 166 to a can-sweep arm 167 fulcrumed at 168. Arm 167 operates to transfer the can from position I to position II.

To facilitate and safeguard the somersaulting movement of the can, a guard 169 may be provided.

Connected with the cover-feeding link 136, at 170, is a can-discharge thrust arm 171 for shoving the can from its position II, off the platform 5, after the can has had its cover reassembled therewith.

Each cover, reaching the discharge end of the apparatus, rides clear of its rails 8 and onto a downwardly inclined extension-frame 172, but is held against gravity discharge by means of hook ended trip arms 173 pivoted at 173a to the inclined discharge ends 172 of cover guide rails 8. The lower ends of the arms 173 are connected by a transverse yoke 174 so that the ends of the arms, located in the path of the covers prevent their discharge until the trip is rocked. In order to rock the trip and release the cover, a link 175 has one end connected to one of the arms and the other end connected to a lever 175a. This lever 175a (shown in Fig. 5) is pivoted at 175' and has its free end projecting in the path of the advancing covers. As the covers are pushed along the guides, the cover in back of the arrested cover pushes against the free end of arm 175a and rocks the cover release. This arrangement insures cover discharge. However, in the conventional operation of the machine, the uprighted can on being swept laterally strikes the yoke 174 and rocks the release and incidentally the lever 175a.

Operation

In the course of the foregoing description, the successive movements and treatments to which the can and covers are subjected, have been described in detail.

In recapitulation, however, referring in the main to Figs. 4 and 5:

First, a can, inverted, is placed upon the can-table 1, and is positioned to be engaged by the first set of claws, 113 and 114. These claws grip the can-neck and advance the can to center it above hot water discharge-means P, whereupon the interior of the can is rinsed and the solid particles of milk are loosened. This treatment completed, the can is gripped by the next set of claws 113 and 114 and advanced to the elevator E above liquid tank 9.

At this stage, the first cover, neck-down, is placed upon the cover table 2.

Next the can is lowered into the tank 9, in which are the stationary brushes 68 and 69 (Fig. 7) for engaging the inside and outside of the can. As the inner brushes 68 expand into the can-body cavity, this occurring when the elevator E has descended its full distance, the can commences to rotate relative to the brushes, due to the grippers 54 and clutch members 48 and 49 now functioning; and the can is scrubbed within and without.

The can, having next been raised by elevator E to the main level, is moved to rinsing station 12; and at the same time the cover, having been moved by a pawl 143 onto elevator E'', is lowered into tank 9 and subjected to a scrubbing all over, except at its top surface, by brushes 82, 83 and 84 (Figs. 7, 10, 11 and 12).

When the can has been rinsed, it is advanced to the first sterilizing station 16, and while there being treated, the cover is advanced to its next position, where its top surface is scrubbed by the rotary spool-shaped brush 10.

Next the can is moved to the second sterilizing station 16', and while being there treated, the cover is advanced to its first sterilizing station 15.

Next the can is moved to the third sterilizing station 16'', and while being thus treated the cover is advanced to its second sterilizing station 15'.

Next the can is moved to the drying station 18, and while there being treated, the cover is advanced to its third sterilizing station 15''.

Next the can is advanced to the tumbling collar 154, and while the can is being passed through the position I to the position II, in both of which positions the can is again upright, the cover, having been dried at its drying station 19, is being thrust onto the inclined extension frame 172.

As the can reaches position II, the anti-gravity detents or levers 173 release the cover, whereupon the latter drops onto the top of the can, so that actuation of thrust device 171 discharges from platform 5 the cleansed, sterilized and dried can and cover, reassembled.

A modified discharge and reassembly means for covers is illustrated in Figs. 22 and 23. Here a shaft 176 is intermittently operated in the same manner as is shaft 30f in Fig. 5. Fast on shaft 176 is a crank-arm 177, which operates, by means of an adjustable connecting rod 178, and a secondary link 179, a lever 180 which is pivoted at 181. Pivotally connected to lever 180 at its upper end, at 182, is a link 183, engaging slide-bar 141 at 184, to cause the latter to reciprocate. Connected with lever 180 at 185 is a link 186 which engages at 187 a lever 188 fulcrumed at 189. To one end of lever 188 is attached one end of a chain 190 passing around a sprocket 191 mounted on a shaft 192. Fixed on the shaft 192 is a swinging part 193 similar to the collar 154 of Figs. 3 and 5. A spring 194 is interposed between the lower end of chain 190 and the lower end of lever 188, providing a yieldable connection. When the lever 188 is rocked in the direction of arrow 188a, part 193 delivers the can to its normal position on platform 5. When the lever 188 is rocked in the opposite direction, the part 193 is returned to normal alignment with the can rails 7.

To the above-mentioned pivot-mounting 185 of lever 180 is connected a link 195 pivoted at 196 to a lever 197 fulcrumed at 198. At the lower end 199 of lever 198 is connected a link 200 which works a thrust rod 201 for shoving the reassembled can and cover off the platform 5.

Lateral shifting of the can over platform 5 to a position in alinement with the cover table 2 is accomplished by an arm 202 operated by an adjustable link 203 pivoted at 204 to a lever 205 fulcrumed at 206 and actuated by the lever 180 through a link 208.

When the can has been thus shifted, it engages the lower arm 210 of a vertical crank lever fulcrumed at 211 and 212, and having its upper arm 213 terminating in a hook 214 intruded into a downwardly inclined frame-extension 215; a spring 216 holding the hook so intruded until the can actuates arm 210.

Inasmuch as many changes could be made in the above constructions, and many apparently widely different embodiments of my invention could be made without departing from the scope thereof, it is intended that all matter contained in the above description or shown in the accompanying drawings shall be interpreted as illustrative and not in a limiting sense.

I claim:

1. Apparatus for purposes described, comprising means for advancing a series of cans in inverted position in a substantially horizontal path, a tank beneath said path, a brush therein, means for lowering the successive cans into the tank in inverted position and into cooperation with the brush, and means for rotating the can while so positioned to produce brushing action.

2. Apparatus for purposes described, comprising means for advancing a series of cans in inverted position in a substantially horizontal path, a tank beneath said path, a brush therein adapted for inside cleaning, another brush in the tank adapted for outside cleaning, means for lowering the successive cans into the tank in inverted position over the inside brush and into engagement with the outside brush, and means for rotating the can while so positioned to produce brushing action.

3. Apparatus for purposes decribed, comprising means for advancing a series of cans in inverted position in a substantially horizontal path, a tank beneath said path, a stationary, expansible brush therein adapted for inside cleaning, another brush in the tank adapted for outside cleaning, means for lowering the successive cans into the tank over the inside brush and into engagement with the outside brush and thereby expanding the inside brush, and means for rotating the can while so positioned to produce brushing action.

4. Apparatus for purposes described, comprising means for advancing a series of cans in inverted position in a substantially horizontal path, a tank beneath said path, a stationary, expansible brush therein adapted for inside cleaning, another brush in the tank adapted for outside cleaning, means for lowering the successive cans into the tank over the inside brush and into engagement with the outside brush and thereby expanding the inside brush and for raising said cans to position for further advance, and means for rotating the can while positioned in engagement with said brushes to produce brushing action.

5. Apparatus for the purpose described combining means for advancing a series of cans, means for advancing a series of covers at one side of the advancing cans, means for placing the cans in an upright position near the delivery end of the cover advancing means, and means for dropping the covers on the can tops.

6. Apparatus for the purpose described combining means for advancing a series of cans, means for advancing a series of covers at one side of the advancing cans, a receiving platform at the delivery end of said can and cover advancing means, means for placing the cans in an upright position on the platform, means for moving the cans in an upright position laterally to a position near the delivery end of the cover advancing means and means for dropping the covers on the can tops.

7. Apparatus for the purpose described combining means for advancing a series of cans in an inverted position in a substantially longitudinal path, means for simultaneously advancing a series of covers at one side of the advancing cans, a receiving platform at the delivery end of said can and cover advancing means, means for placing the cans in an upright position on the platform, means for moving the cans in upright position laterally to a position near the delivery end of the cover advancing means, and means for dropping the covers on the can tops.

8. Apparatus for the purpose described combining means for advancing a series of cans in an inverted position in a substantially longitudinal path, means for simultaneously advancing a series of covers at one side of the advancing cans, a receiving platform at the delivery end of said can and cover advancing means, means for placing the cans in an upright position on the platform, means for sweeping the cans in upright position laterally to a position near the delivery end of the cover advancing means, and means for dropping the covers on the can tops.

9. Can and cover handling machines combining a guideway for supporting the cans, a guideway for supporting can covers located at one side of the guideway for supporting the cans, means at the delivery end of the machine for sweeping a can in right-side up position in line with the advancing covers and means for gravity feeding a cover to the top of the can from the guideway for supporting the covers.

10. Can and cover handling machines combining a guideway for supporting can covers at one side of advancing cans, a can receiving platform below said guideway, means for positioning a can in line with the advancing covers in upright position on the platform, means to apply the covers to the cans below the can cover guideway, and means to push the cans along the platform after the cover is applied.

11. Can and cover handling machines combining a guideway for supporting cans, a guideway for supporting can covers located at one side of the guideway for supporting the cans, means at the delivery end of the machine for positioning a can in line with and below the guideway for advancing the covers, means to drop the covers to the cans and means to advance the cans after the cover is applied.

12. Apparatus for the purpose described, combining a can guideway for inverted cans, a cover guideway, means for advancing the cans in said guideway, means at the delivery end of said can guideway for uprighting the cans, mechanism for moving the uprighted cans to a position below the delivery point of the cover-advancing guideway, and means for causing a cover as each can is moved below said delivery point to descend to the can top from said cover guideway.

13. Apparatus for the purpose described, combining means comprising a can guideway for advancing a series of cans in inverted position, means other than the means for advancing the cans comprising a cover guideway for simultaneously advancing a series of covers in the same general direction as the cans, the delivery point of the cover guideway being extended beyond the means for advancing the cans in inverted position, means at the delivery end of the can advancing means for righting the cans. mechanism for moving the righted cans to a position below the delivery point of the cover-advancing guideway, means for causing a cover as each can is moved below said delivery point to descend to the can top, and means for moving the cans with their applied covers away from the cover applying position.

14. Apparatus for the purpose described combining means comprising a can guideway for advancing a series of cans in inverted position, means, comprising a cover guideway for advancing a series of covers in the same general direction as the cans are advanced, the cover guideway having a discharge point for discharging the covers, the discharge point of the cover guideway being located beyond the discharge point of the can guideway, a horizontal receiving platform having a flat top surface at and below the discharge points of the can and cover guideways, means for righting the cans by swinging each can about a horizontal axis located adjacent the open end of the can and at right angles to the direction of advance of the cans, and depositing them in a vertical righted position on the horizontal platform below the level of the can and cover advancing guideways and means for applying a cover from said cover guideway as each can is placed below the discharge point of the cover guideway.

15. Apparatus for the purpose described, combining means for guiding a series of advancing cans in inverted position and means at the discharge end of the can guiding means for swinging each can in an arc about a horizontal axis located immediately adjacent the open end and depositing it in upright position.

16. Apparatus for the purpose described, combining means for guiding a series of advancing cans in inverted position and means, at the discharge end of the can guiding means, for swinging each can in an arc about a horizontal axis located immediately adjacent the open end and substantially at right angles to the direction of advance of the cans, and depositing it in upright position.

CARL BRAUN.

DISCLAIMER 2,017,941.—*Carl Braun*, Canastota, N. Y. DEVICE FOR CLEANING RECEPTACLES. Patent dated October 22, 1935. Disclaimer filed February 12, 1941, by the assignee, *Carl Braun, Inc.*

Hereby enters this disclaimer for so much of claims 12 and 13 which is in excess of the following:

12. Apparatus for the purpose described, combining a can guideway for inverted cans, a cover guideway, means for advancing the cans in said guideway, means at the delivery end of said can guideway for uprighting the cans, mechanism for moving the uprighted cans laterally to a position below the delivery point of the cover-advancing guideway, and means for causing a cover as each can is moved below said delivery point to descend to the can top from said cover guideway.

13. Apparatus for the purpose described, combining means comprising a can guideway for advancing a series of cans in inverted position, means other than the means for advancing the cans comprising a cover guideway for simultaneously advancing a series of covers in the same general direction as the cans, the delivery point of the cover guideway being extended beyond the means for advancing the cans in inverted position, means at the delivery end of the can advancing means for righting the cans, mechanism for moving the righted cans laterally to a position below the delivery point of the cover-advancing guideway, means for causing a cover as each can is moved below said delivery point to descend to the can top, and means for moving the cans with their applied covers away from the cover applying position.

[*Official Gazette March 11, 1941.*]